(12) United States Patent
Rao et al.

(10) Patent No.: US 7,802,304 B2
(45) Date of Patent: Sep. 21, 2010

(54) METHOD AND SYSTEM OF PROVIDING AN INTEGRATED REPUTATION SERVICE

(75) Inventors: Anup V. Rao, San Jose, CA (US); Michael Thomas, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 944 days.

(21) Appl. No.: 11/370,282

(22) Filed: Mar. 7, 2006

(65) Prior Publication Data

US 2007/0214506 A1    Sep. 13, 2007

(51) Int. Cl.
*G06F 11/00* (2006.01)
*G06F 12/14* (2006.01)
*G06F 12/16* (2006.01)
*G08B 23/00* (2006.01)

(52) U.S. Cl. ..................................................... 726/25

(58) Field of Classification Search .................... 726/25
See application file for complete search history.

(56) References Cited

U.S. PATENT DOCUMENTS

| 2005/0201363 A1* | 9/2005 | Gilchrist et al. ............. 370/352 |
| 2006/0015942 A1* | 1/2006 | Judge et al. .................. 726/24 |
| 2006/0031314 A1* | 2/2006 | Brahms et al. .............. 709/206 |
| 2007/0118484 A1* | 5/2007 | Borenstein et al. ............ 705/75 |

* cited by examiner

*Primary Examiner*—Kambiz Zand
*Assistant Examiner*—Jason K Gee
(74) *Attorney, Agent, or Firm*—Stolowitz Ford Cowger LLP (57) ABSTRACT

Reputation information, associated with a source that utilizes different communication formats, is accessed. First reputation information for one of the communication formats used by the source is correlated with second reputation information for another of the communication formats used by the source. A reputation measure is determined. The reputation measure provides a measure of the source's reputation, using the first and second reputation information.

21 Claims, 7 Drawing Sheets

METHOD AND SYSTEM OF PROVIDING AN INTEGRATED REPUTATION SERVICE

FIELD OF THE INVENTION

The present invention relates broadly to communication networks. More specifically, embodiments of the present invention relate to reputation services.

BACKGROUND

Electronic mail (email) is the transmission of messages or computer files between computers that are connected to the Internet or some other communications network. Typically, email messages contain text, but non-text files, such as graphic images and sound files as attachments, can also be sent. Because emails are easy and inexpensive to send, many commercial advertisers are resorting to spam mail. Spam is another name for unsolicited electronic junk mail or junk newsgroup postings. More specifically, spam by email involves sending identical or nearly identical electronic messages by email to thousands (or millions) of recipients. A spammer is someone who sends out significant quantities of email advertisements, promotions, or scams that are unsolicited by the receiver of the spam.

Often times, spam email lists are created from email addresses harvested from Usernet postings or web pages, discussion boards and groups, databases, or are simply guessed by using common names and domains. There are also hundreds of companies that are willing to sell compact disks filled with millions of valid email addresses. The ease of spammers in obtaining valid email addresses makes it likely that many people with an active email account will be spammed.

On the individual scale, spam is problematic because it is often an unwanted intrusion on the recipient's time, mailbox space, and resources. For many Internet Service Providers, spam is considered to be a great financial drain and an impediment to Internet access because it can clog available bandwidth. However, because the Internet is a public network and because spamming can be extremely lucrative to the spammer, even when the response rate is very low, the practice is hard to stamp out.

Aside from email, it is believed that spam will infiltrate its way into other communication formats such as Voice over Internet Protocol (VoIP) and instant messaging (IM). VoIP is a way of utilizing the Internet and/or intranets for telephone conversations. IM is used to send messages back and forth through the Internet to a specific user, or between specific users. Because VoIP is usually significantly less expensive than typical long distance calls and IM can facilitate rapid communication between users, both VoIP and IM are gaining wider acceptance.

In the future, as VoIP and IM become mainstreamed, they will also suffer from spam problems such as unsolicited commercial phone calls over VoIP (Spam over Internet Telephony, SPIT) and unsolicited instant messaging (Spam over Instant Message, SPIM).

DETAILED DESCRIPTION OF THE INVENTION

Integrated reputation service systems are described. Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

In overview, embodiments of the present invention pertain to a reputation service that allows data collected for one communication format (e.g., email, Voice over Internet Protocol, and instant messaging) to be correlated to other communication formats. More specifically, this means the present invention can confirm a sender's (also referred to herein as a source, or a message source) reputation by checking across various communication formats used by the sender and/or deduce a sender's reputation for one communication format based on that sender's reputations for other communication formats. Further, by being able to correlate across the communication formats, the present invention can give a reputation score (also referred to as a reputation measure) of a sender's reputation across various communication formats. In some instances, the present invention will be able to correlate across the communication formats by utilizing one of the following: the IP addresses of the senders, authentication of the sender's domain, and authentication of the senders' Uniform Resource Identification.

In one embodiment, the present invention also includes deploying a honeypot account associated with Voice over Internet Protocol. The honeypot account thus deployed can be used to attract Voice over Internet Protocol spammers. The information (also referred to as knowledge) collected from the honeypot account can further be used by the present invention much as other reputation information is used by the present invention.

Figure 1:
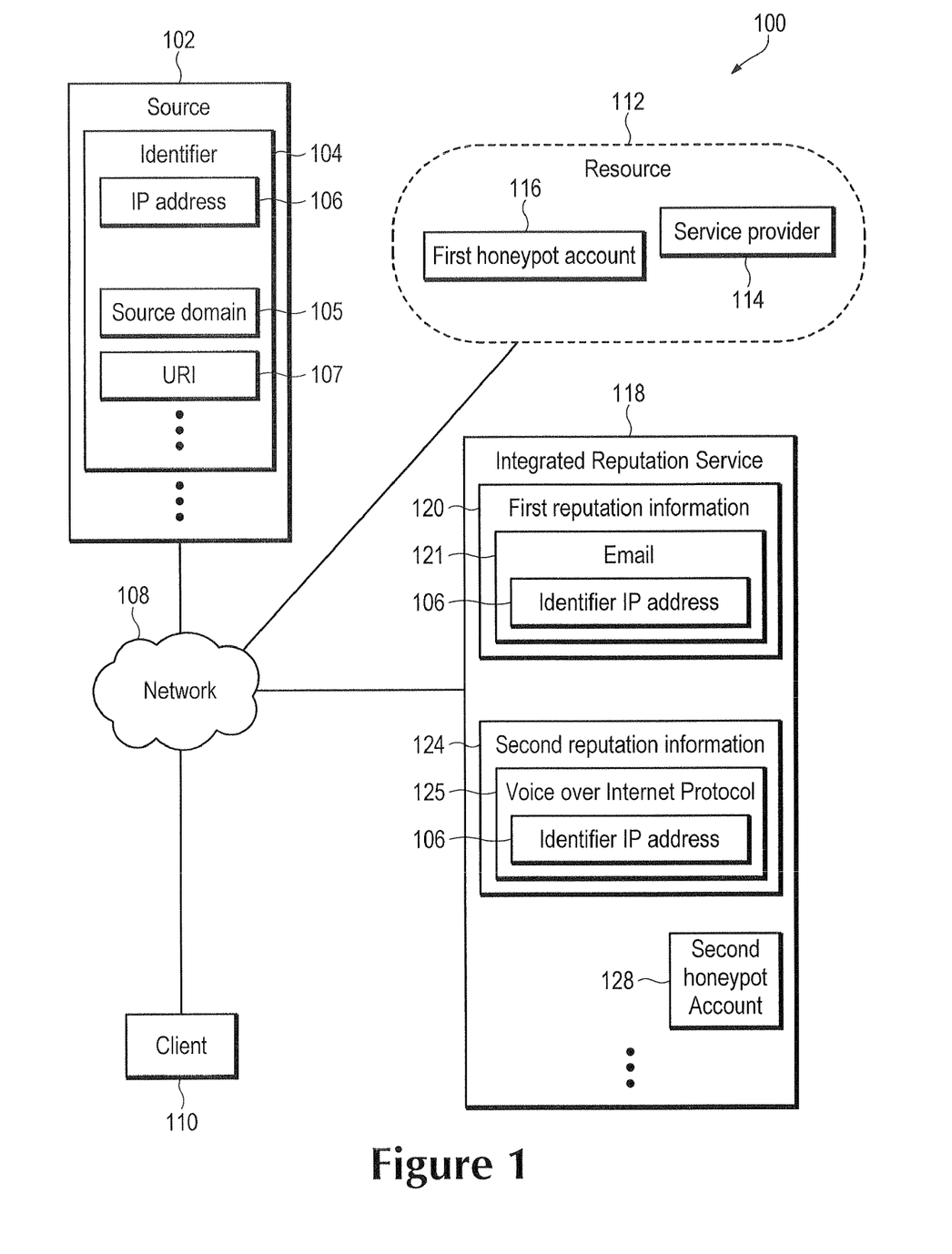
FIG. 1 illustrates a block diagram of an exemplary integrated reputation service system, used in accordance with an embodiment of the present invention.

FIG. 1 is a block diagram of an example of a system 100 upon which embodiments in accordance with the present invention may be implemented. The system 100 shows the components of an exemplary integrated reputation service system in accordance with the present invention. As depicted in FIG. 1, the exemplary integrated reputation service system 100 includes a message source 102, a client 110, a resource 112, and an integrated reputation service 118 all coupled with one another via a network 108. The source 102 includes identifier 104. Although system 100 is shown and described as having certain numbers and types of elements, the present invention is not so limited; that is, system 100 may include elements other than those shown, and may include more than one of the elements that are shown.

In the present embodiment, identifier 104 includes a variety of ways to identify source 102, such as but not limited to: utilization and/or authentication of the source's IP address (e.g., IP address 106), authentication of the source's domain (e.g., source domain 105), and utilization of the source's Uniform Resource Identifier (e.g., URI 107). One or more of the identifiers 106, 105, 107 may be used.

In the present embodiment depicted by FIG. 1, the integrated reputation service 118 includes first reputation information 120, second reputation information 124, and honeypot account 128. The first reputation information 120 includes reputation information for a first type of communication format. The second reputation information 124 includes reputation information for a second type of communication format. In one embodiment, the communication formats are selected from a group that includes, but is not limited to: email, instant messaging, and Voice over Internet Protocol. The honeypot account 128 is associated with one of the communication formats. The integrated reputation service 118 can utilize more than two sets of reputation information. Either the first reputation information 120 or the second reputation information 124 can be null.

In the system 100 embodiment, resource 112 includes a honeypot account 116 and a service provider 114. Both honeypot account 116 and service provider 114 are resources that provide reputation information for a source of a message. In another embodiment, there is no honeypot account in resource 112, or no service provider. Resource 112 can include other resources aside from the honeypot account 116 and the service provider 114 as depicted in FIG. 1.

Source 102, as depicted in FIG. 1, is the source of a message that client 110 receives via the network 108. The message may utilize any one of the communication formats. The identifier 104 allows the integrated reputation service 118 to identify the source of the message sent to the client 110. Identification of the source is useful in many instances. For example, conventionally, because reputations of the senders can be determined by identifying the source of various spam emails, reputation service providers are generally able to examine the history of email originators instead of examining email messages on a case-by-case basis. Furthermore, because spammers often repeat their emailing patterns, numerous unwanted emails can be blocked by rejection of all messages from a sender with a bad reputation. This method of utilizing a reputation service provider is often attractive to users because it provides a marked decrease in spam and reduces the central processing unit load of content filtering.

As depicted by system 100, network 108 is a data communications system that interconnects devices. The network 108 can be implemented in a wide variety of ways. For example, network 108 can be implemented as, but is not limited to, a local area network (LAN), a metropolitan area network (MAN), a wide area network (WAN), and/or the Internet. In one embodiment, network 108 is a wireless network.

The client 110 of the system 100, depicted by FIG. 1, can be an individual user device, an application program, an enterprise, or a service provider. Furthermore, in one embodiment, the client is coupled with the integrated reputation service 118 via the network, as depicted in system 100. In another embodiment, the client 110 is coupled with the integrated reputation service 118 directly, bypassing the network 108. There can be more than one client and/or types of clients in the integrated reputation system 100.

As depicted by FIG. 1, in one embodiment, the integrated reputation service 118 is a reputation service that integrates the reputation of a source across the various communication formats. An embodiment of the present invention will now be described in detail using the particular example illustrated in FIG. 1.

In the example of FIG. 1, the integrated reputation service 118 includes first reputation information 120 for the email communication format (e.g., email 121). The first reputation information 120 is indexed with an IP address (e.g., identifier IP address 106). The integrated reputation service 118 also includes second reputation information 124 for the Voice over Internet Protocol communication format (e.g., Voice over Internet Protocol 125). The second reputation information is also indexed with an identifier IP address 106.

In the example of FIG. 1, the identifier IP address 106 is used by the integrated reputation service 118 to identify the source of the email 121 and the Voice over Internet Protocol 125. The first reputation information 120 or the second reputation information 124 may be for a different communication format (e.g., instant message). The first reputation information 120 or the second reputation information 124 can be null.

In the present embodiment as depicted by FIG. 1, the first reputation information 120 and the second reputation information 124 are stored within the memory of the integrated reputation service 118. The integrated reputation service 118 can include other reputation information aside from first reputation information 120 and the second reputation information 124. There can be various combinations of reputation information, or a combination of sources, stored in the memory of the integrated reputation service 118.

In the present embodiment, second honeypot account 128 is a honeypot account associated with a Voice over Internet Protocol system. Honeypot accounts work as fictional accounts that draw in spam. Thus, the second honeypot account 128 will attract illegitimate Voice over Internet Protocol calls or Session Initiation Protocol requests. As a result, attempts to call or contact the second honeypot account will be Spam over Internet Telephone (SPIT). The source information gathered by monitoring the calls or requests to second honeypot account 128 can then be used by the integrated reputation service 118 to prevent the same calls or request from reaching a client. In another embodiment, the integrated reputation service 118 can include one or more honeypot accounts associated with either one communication format or a plurality of communication formats.

Resource 112 of system 100 refers to the resources from which the integrated reputation service 118 will collect reputation information. In one embodiment, the reputation information for a source is categorized by a plurality of communication formats (e.g., email, instant message, and Voice over Internet Protocol). As depicted in FIG. 1, in one embodiment, resource 112 includes a service provider 114 and first honeypot account 116. Resource 112 can include greater or fewer numbers of resources from which the integrated reputation service 118 can collect reputation information for one or more sources. In one embodiment, resource 112 includes a third-party reputation provider. Resource 112, in one embodiment, includes a variety of types of resources (e.g., two service providers and three honeypot accounts). Also, resource 112 can include any number of resources (e.g., five honeypot accounts). Resource 112 can be coupled with the integrated reputation service 118 in a variety of ways. In the present embodiment, as depicted by FIG. 1, resource 112 is coupled with the integrated reputation service 118 via the network 108. In another embodiment, resource 112 is coupled with the integrated reputation service 118 directly, bypassing network 108.

The honeypot accounts (e.g., first honeypot account 116 and second honeypot account 128) do not need to be owned by a service provider 114 or a third party reputation provider. In one embodiment, the honeypot accounts 116 and 128 will gather knowledge, including things such as sources of the messages, contents of the subject lines, and paths taken by the messages (e.g., Session Initiation Protocol via headers) without being managed by a third party reputation service. In another embodiment, a honeypot account is managed by a third-party service provider. The honeypot accounts can be enhanced. In one embodiment, the enhancement includes an automated call distributor. In another embodiment, the honeypot account phone numbers and Uniform Resource Locator are integrated with other applications, such as message tracking applications.

Figure 2A:
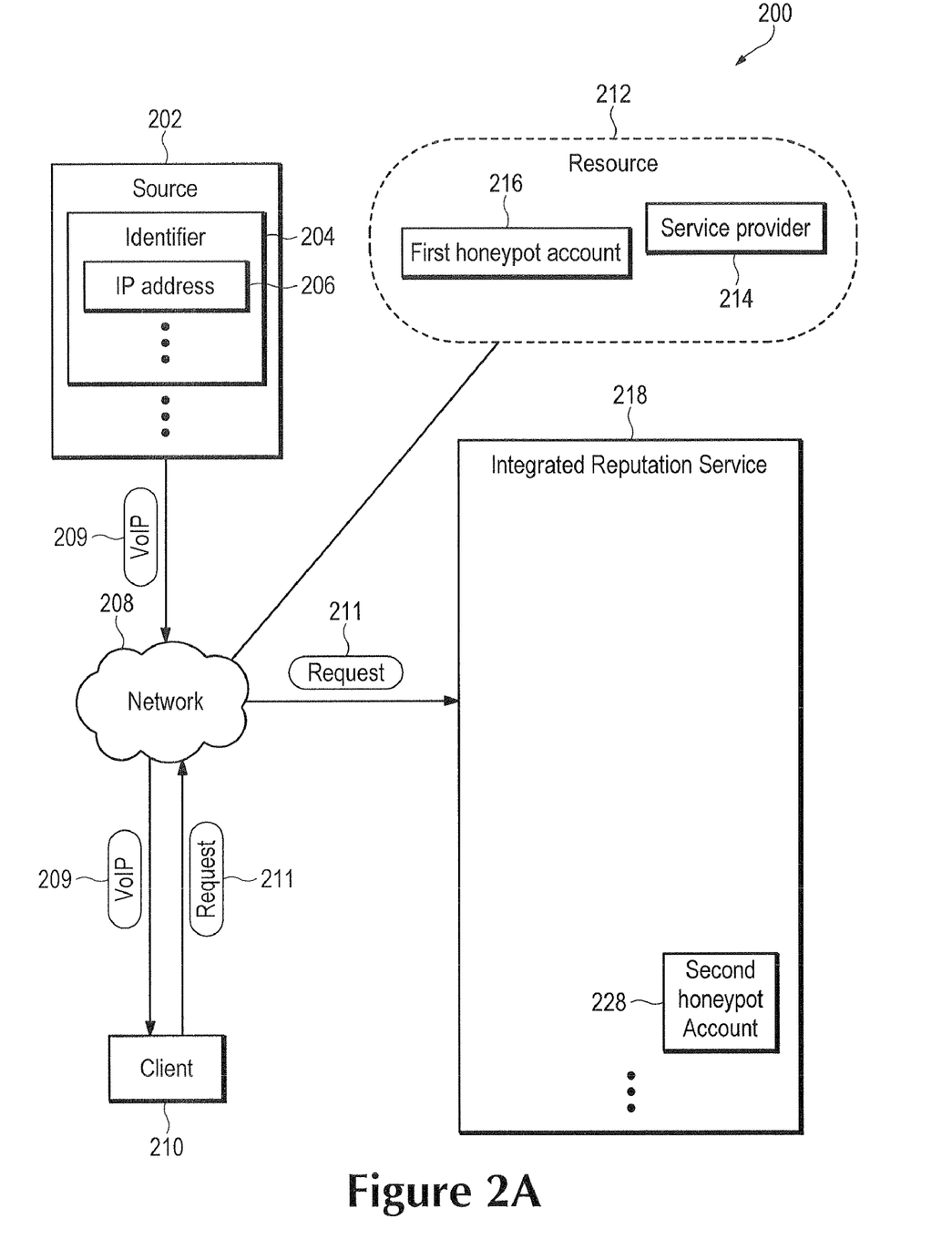
FIG. 2A illustrates a block diagram of the present invention in operation, according to an embodiment of the present invention.
Figure 2B:
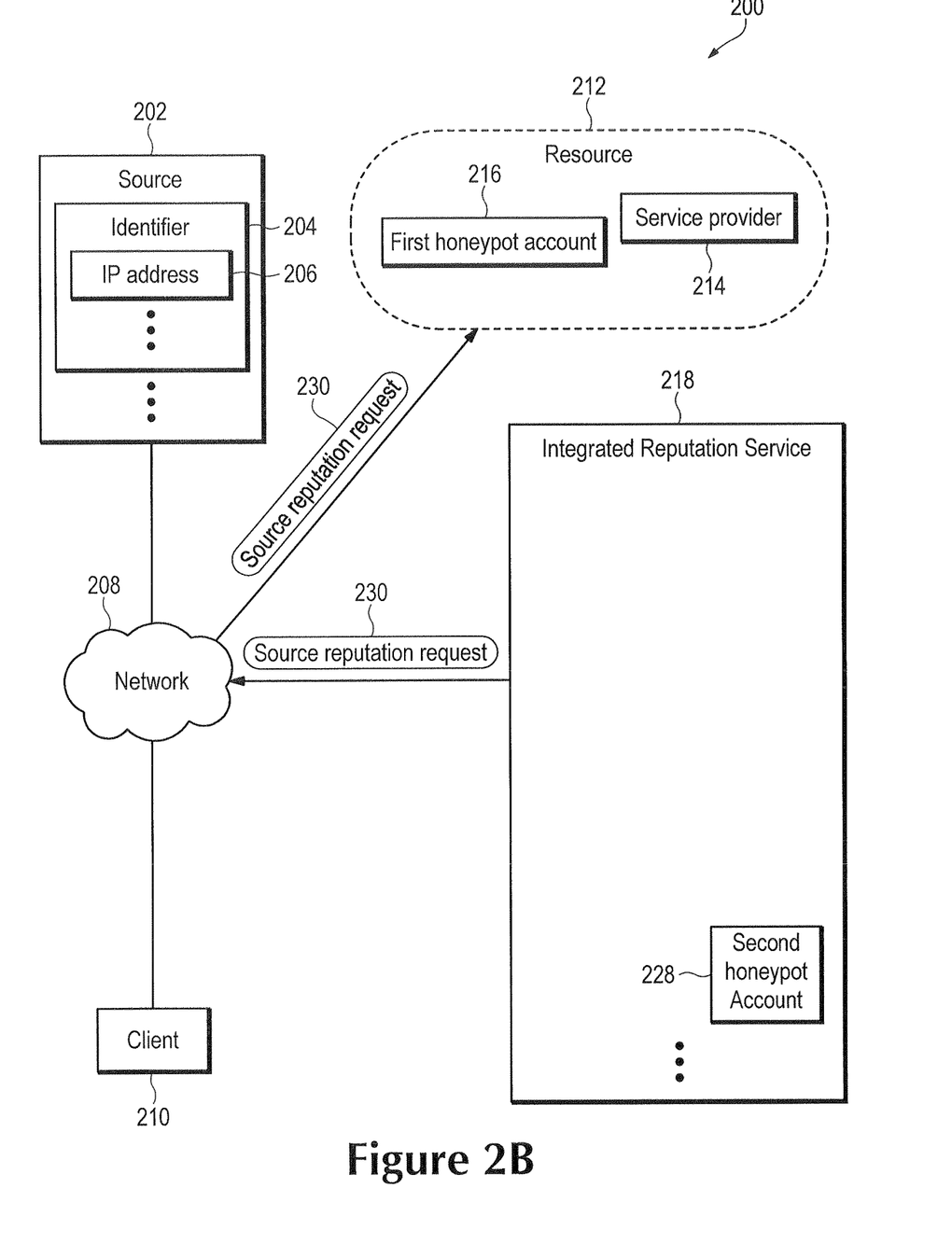
FIG. 2B illustrates a block diagram of the present invention in operation, according to an embodiment of the present invention.
Figure 2C:
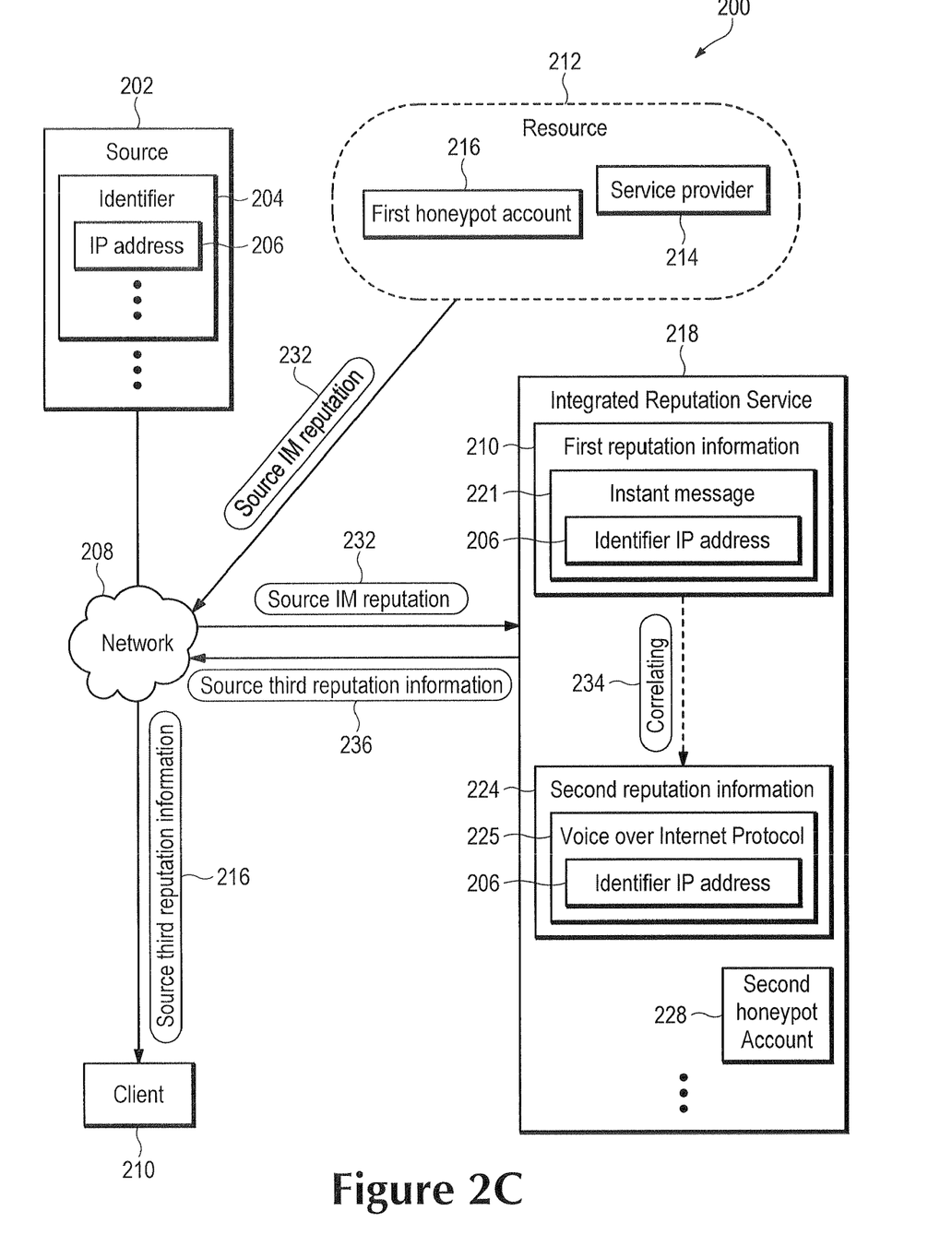
FIG. 2C illustrates a block diagram of the present invention in operation, according to an embodiment of the present invention.

FIGS. 2A, 2B, and 2C illustrate block diagrams of the present invention in operation, according to an embodiment of the present invention. The system 200 includes a source 202, a network 208, a client 210, a resource 212, and an integrated reputation service 218. In this embodiment, source 202 includes an IP address 206 as part of identifier 204. The resource 212 includes a service provider 214 and first honeypot account 216. Furthermore, in the embodiments depicted by FIGS. 2A, 2B, and 2C the integrated reputation service 218 includes second honeypot account 228.

In FIGS. 2A-2C, the present invention is described in the context of an example in which the client 210 receives a Voice over Internet Protocol request, but the integrated reputation service 218 has reputation information only for the instant message communication format. However, this example can be readily extended to other communication, formats. In general, the present invention pertains to correlating information that exists for one or more communication formats to one or more other communication formats. In addition, a communication format may include various communication formats (e.g., email, instant messaging, and Voice over Internet Protocol). Furthermore, information set of one or more communication formats for correlating may be null.

In reference to the embodiment depicted by FIGS. 2A, 2B, and 2C, the client 210 is coupled with the source 202, the resource 212 and the integrated reputation service 218 via the network 208. In another embodiment, there are more than one clients connected with the integrated reputation service 218. In yet another embodiment, there are more than one sources connected with the integrated reputation service 218.

In reference now to FIG. 2A, in operation, in one embodiment, the client 210 receives a Voice over Internet Protocol signal (e.g., VoIP 209) from the source 202 via the network 208. The client 210 sends a request 211 to the integrated reputation service 218 via the network 208. The request 211 is a request for reputation information (also referred to as third reputation information) for source 202. In the present embodiment, reputation information is a reputation measure of the source's (e.g., source 202) reputation. In another embodiment, the reputation information includes other reputation information, aside from or in addition to, the reputation measure, such as: the age of the source domain, the recent activity level of the source domain, and the source domain's propensity to initiate spam, spam over Internet telephony (SPIT), and spam over instant messaging (SPIM).

Still in reference to FIG. 2A, in another embodiment, the integrated reputation service 218 is local. This means that the reputation request (e.g., request 211) can be sent to the integrated reputation service 218 directly first without having to go through the network 208. That is, an integrated reputation service may be maintained on client 210, or on a device that communicated with client 210 outside of network 208. Furthermore, in yet another embodiment, there is a first integrated reputation service that exists locally and another integrated reputation service 218 that is a third-party reputation service. In that embodiment, the reputation request 211 can be sent to the local integrated reputation service first for reputation information, then if the local integrated reputation service does not have the requested reputation information, then the request 211 can be sent to the integrated reputation service 218 via the network 208. In one embodiment, the network 208 includes a communication server (e.g., email server). In such an embodiment, the request to retrieve the reputation information is performed by the communication server of network 208 in path between the spammer (e.g., source 202) and the client 210. In yet another embodiment, the request to retrieve the reputation information is initiated by the client 210.

In reference now to FIG. 2B, the integrated reputation service 218 processes the request 211. In the present embodiment, the integrated reputation service 218 also sends a source reputation request 230 to the resource 212 via the network 208. In another embodiment, the integrated reputation service 218 accesses the information stored in its memory first, then sends a source reputation request 230 to the resource 212. In yet another embodiment, the integrated reputation service 218 accesses the information stored in its memory, or information gathered by the honeypot account 228, without sending a source reputation request 230 to the resource 212.

In reference to FIG. 2C, the resource 212 sends the source's instant message reputation information (e.g., source IM reputation 232) to the integrated reputation service 218 via the network 208. The integrated reputation service 218 receives the source's instant message reputation information (e.g., source IM reputation 232) as part of first reputation information 220. Thus the first reputation information 220 includes reputation information for the instant message communication format (e.g., instant message 221). Reputation information for the instant message communication format 221 is indexed by an identifier 206, which, in the present embodiment, is the IP) address of the source (e.g., IP) address 206). The identifier 206 is used to identify the source of the reputation information of an instant message. In this embodiment, second reputation information 224 is null before the integrated reputation service 218 correlates the first reputation information 220 to the second reputation information 224. This means that, in this embodiment, until the reputation information for the source's instant messaging communication format (e.g., instant message 221) is correlated to reputation information for the source's Voice over Internet Protocol communication format, there is no information on the source's Voice over Internet Protocol communication format in the integrated reputation service 218.

In another embodiment, the second reputation information 224 includes some reputation information before the first reputation information is correlated to the second reputation information. In yet another embodiment, the first reputation information for another communication format used by source 202 (e.g., reputation information 220) is itself null. The resource 212 can send the source's email reputation information in addition to, or in place, of the source's instant message reputation information (e.g., instead of source IM reputation 232).

Still in reference to FIG. 2C, the integrated reputation service 218 correlates first reputation information 220 to the second reputation information 224. Also, the integrated reputation service 218 determines a reputation measure using the first reputation information 220 and the second reputation information 224. The reputation measure provides a measure of the source's reputation. The reputation measure can take form in various ways. In one embodiment, the reputation measure is a range of numbers indicating the propensity of the source in generating spam. In another embodiment, the reputation measure is an indication of the source's propensity to generate spam.

In further reference to FIG. 2C, in present embodiment, the integrated reputation service 218 sends third reputation information of the source 202 (e.g., source third reputation information 236) to the client 210 via the network 208. The third reputation information (e.g., source third reputation information 236) can include a variety of reputation information. In one embodiment, the source third reputation information 236 includes the reputation measure determined by the integrated reputation service 218. In another embodiment, the source third reputation information 236 includes information from the first reputation information 220 and the second reputation information 224. In yet another embodiment, the source third reputation information 236 includes information not included in the first reputation information 220 and the second reputation information 224.

Figure 3:
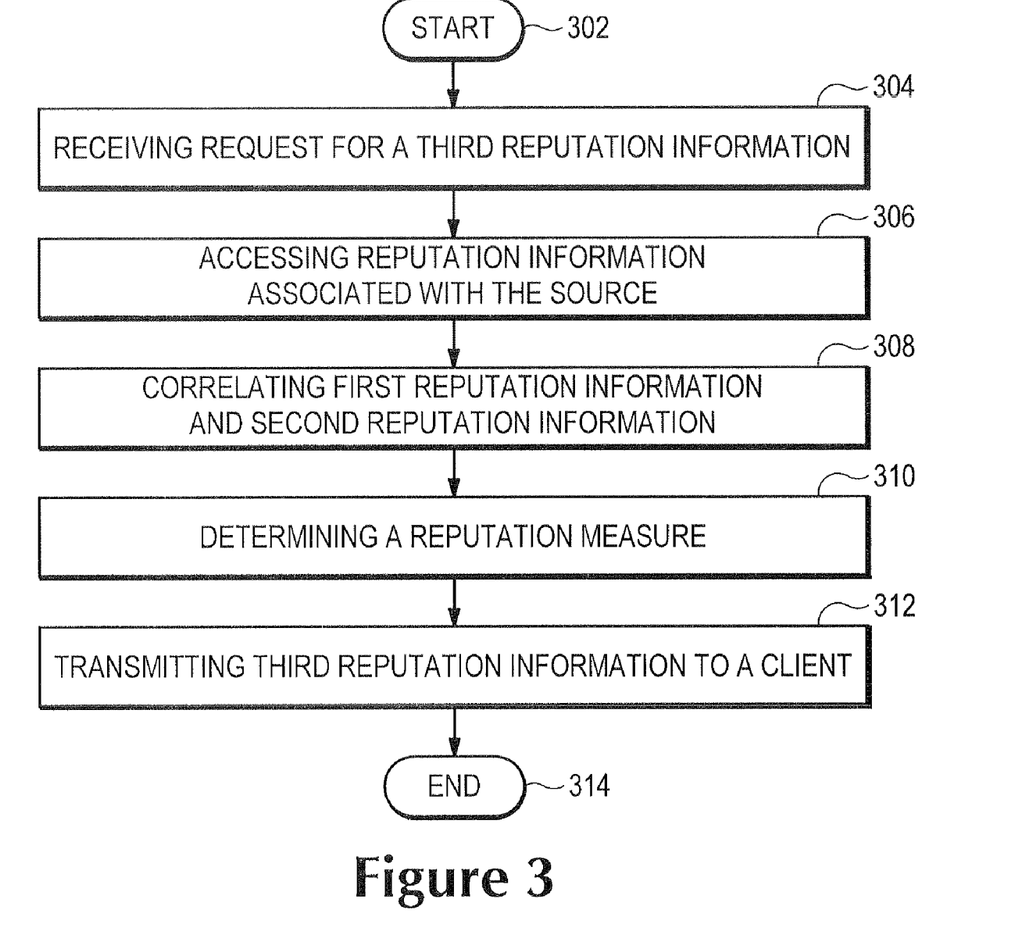
FIG. 3 illustrates a flowchart showing a method for providing an integrated reputation service, according to an embodiment of the present invention.

FIG. 3 illustrates a flowchart showing a method 300 for providing an integrated reputation service, according to an embodiment of the present invention. In one embodiment method 300 is implemented by the integrated reputation service 118 or 218 (FIGS. 1 and 2A-2C). Although specific steps are disclosed in flowchart 300, such steps are exemplary. That is, embodiments of the present invention are well suited to performing various other additional steps or variations of the steps recited in flowchart 300. It is appreciated that the steps in flowchart 300 may be performed in an order different than presented. At block 302 of FIG. 3, the process starts.

At block 304 of FIG. 3, a request from a client, which specifies reputation information for at least one of the communication formats associated with a source is received. A client can be an individual user device, an enterprise, a service provider, or an application program. Also, there can be multiple numbers and/or types of clients at a time. In one embodiment, a plurality of requests is received.

At block 306, reputation information associated with the source is accessed by the integrated reputation service. In one embodiment, there are multiple resources (e.g., service providers, honeypot accounts) from which reputation information is collected by the integrated reputation service. In another embodiment, the integrated reputation service first accesses the reputation information stored in its memory and gathered by its own honeypot account. Then if the reputation information in its memory or gathered from its own honeypot account is insufficient, the integrated reputation service accesses the reputation information from one or more resources. In another embodiment, the integrated reputation service accesses reputation information within its own memory or from its own honeypot account without having to access reputation information from a resource. A client may also access an integrated reputation service and related honeypot accounts owned and operated by a separate service provider. In yet another embodiment, an integrated reputation service and related honeypot accounts are integrated within a client's system (e.g., a large enterprise client that creates telephone honeypot accounts and a reputation correlator to produce reputation information based on all the messages the honeypot accounts receive.)

At block 308, the integrated reputation service correlates a first reputation information for one of the communication formats used by the source and a second reputation information for another of the communication formats used by the source. In one embodiment, either the first reputation information or the second reputation information is null. In one embodiment, the integrated reputation service correlates information that exists for three communication formats (e.g., email, IM, VoIP) and produces an integrated measure. In such an embodiment, an integrated measure could be produced by the integrated reputation service even if one of the sets of information is null.

At block 310, the integrated reputation service determines a reputation measure using the first and second reputation information. The reputation measure can be manifested in a variety of ways. In one embodiment, the reputation measure is a range of numbers that indicates the source's propensity to generate spam. In another embodiment, the reputation measure is an indication of whether the source is on a blacklist or a white list. In yet another embodiment, the reputation measure is a number that indicates to the client how the source ranks on a blacklist.

At block 312, the integrated reputation service transmits third reputation information for at least one of the communication formats associated with the source to a client. The third reputation information can include reputation information for a variety of combinations of a plurality of communication formats. In one embodiment, the third reputation information includes the reputation measure for the source. In another embodiment, the third reputation information does not include the reputation measure for the source. At block 314, the process ends.

Thus by correlating reputation information across various communication formats (e.g., email, instant message, Voice over Internet Protocol), an integrated reputation service (e.g., 118) can advantageously create white lists, black lists, and reputations for various sources and/or senders for various communication formats. More specifically, as spammers switch spamming communication formats (e.g., from spam by email to spam over internet telephony), consumers and/or clients will not have to wait for those spammers to establish reputations in the new communication formats before integrated reputation services can be effectively utilized.

Figure 4:
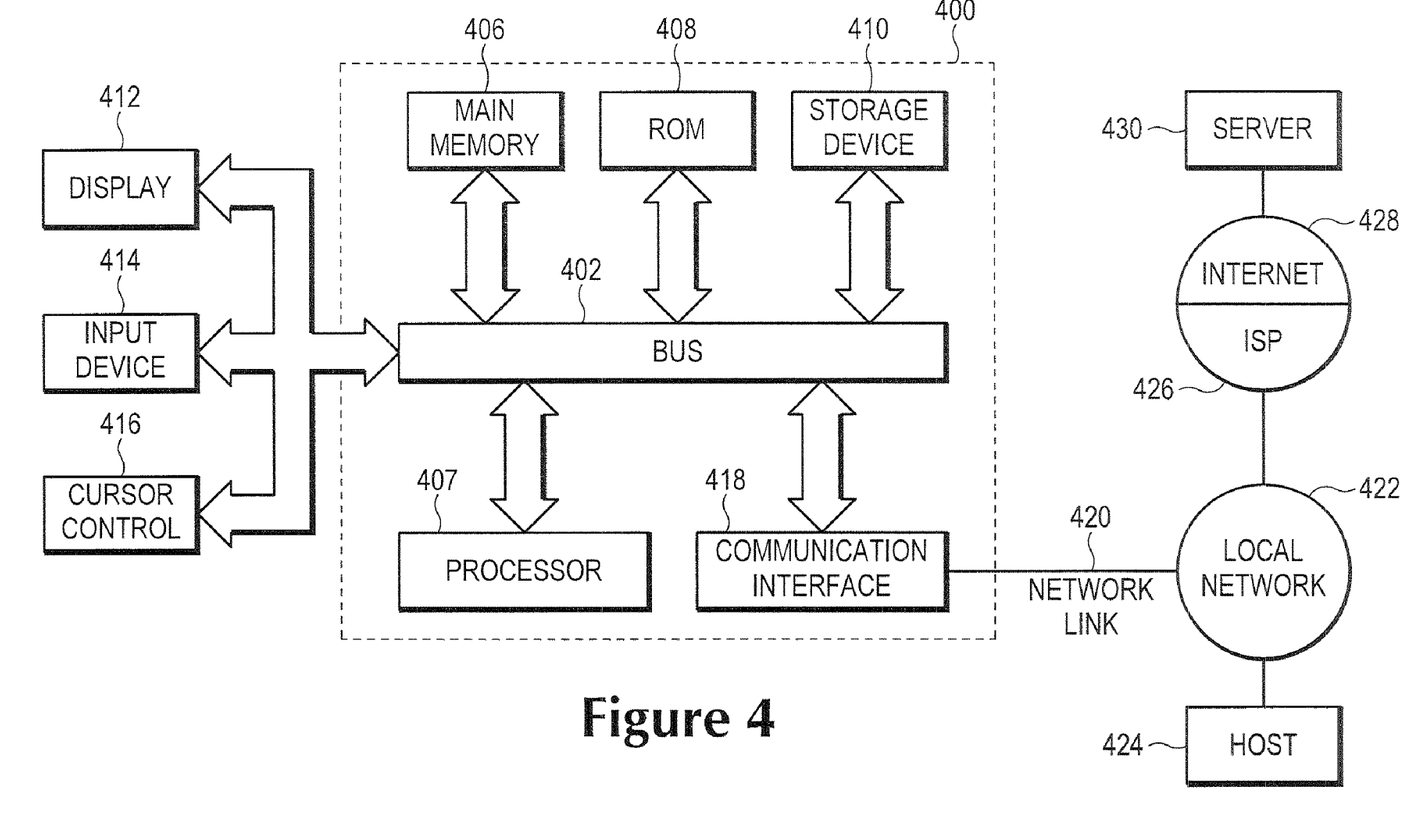
FIG. 4 is a block diagram that illustrates a computer system upon which embodiments of the invention may be implemented.

FIG. 4 is a block diagram that illustrates a computer system 400 upon which embodiments of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to an optional display 412 for displaying information to a computer user. An input device 414, including alphanumeric and other keys, may be coupled to bus 402 for communicating information and command selections to processor 404. Another type of user input device may include a cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for providing integrated reputation service. According to one embodiment of the invention, integrated reputation service is provided by computer system 400 in response to processor 404 executing one or more sequences of one or more instructions contained in main memory 406. Such instructions may be read into main memory 406 from another computer readable medium, such as storage device 410. Execution of the sequences of instructions contained in main memory 406 causes processor 404 to perform the process steps described herein. One or more processors in a multi-processing arrangement may also be employed to execute the sequences of instructions contained in memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 may also include a communication interface 418 coupled to bus 402. Communication interface 418 may provide a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of carrier waves transporting the information.

Computer system 400 can send information and receive information, including program code, through the network (s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage device 410, or other non-volatile storage for later execution. In this manner, computer system 400 may obtain application code in the form of a carrier wave.

Figure 5:
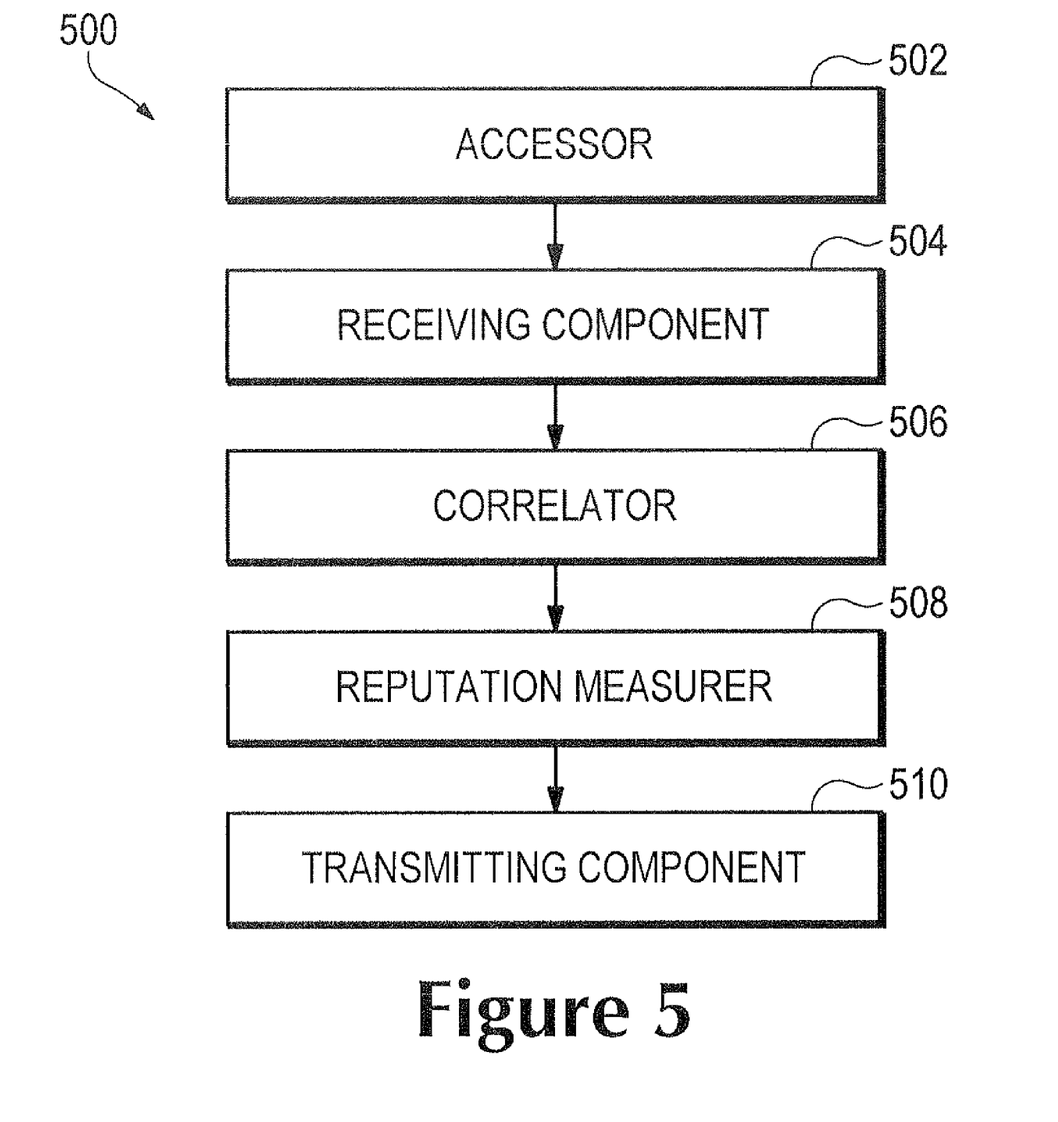
FIG. 5 illustrates a block diagram of an example of a system upon which embodiments in accordance with the present invention may be implemented.

FIG. 5 illustrates a block diagram of an example of a system 500 upon which embodiments in accordance with the present invention may be implemented. The system 500 shows the components of an exemplary integrated reputation service system in accordance with the present invention. As depicted in FIG. 5, the exemplary integrated reputation service system 500 includes a receiving component 504, a correlator 506, a reputation measurer 508, and a transmitting component 510 all coupled with an accessor 502. The accessor 502 accesses a set of reputation information associated with a source. The receiving component 504 receives the reputation information associated with the source, while the correlator 506 correlates the reputation information (e.g., first reputation information) for one communication format associated with the source and reputation information for another communication format associated with the source (e.g., second reputation information). In addition, the reputation measurer 508 determines a reputation measure using the first and second reputation information. Furthermore, the transmitting component 510 transmits a set of reputation information (e.g., third reputation information) to a client.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A system comprising:
a first database maintained by a first service provider to manage communications comprising a first type of communication format, wherein said first database is configured to store a first reputation information for said first type of communication format and to associate said first reputation information with a source of said first type of communication format; and
a processor configured to:
receive a request from said source to make a connection with an endpoint, wherein said connection is associated with a second type of communication format different from said first type of communication format;
request a second reputation information for said second type of communication format associated with said source, wherein said request for said second reputation information is requested from a second database maintained by a second service provider, and wherein said second database is maintained remotely from said processor;
receive said second reputation information responsive to said request;
obtain said first reputation information from said first database, wherein said first reputation information is obtained in response to said request for said connection associated with said second type of communication format, and wherein said first database is maintained locally to said processor; and
correlate said first reputation information with said second reputation information to determine an integrated reputation measure of said source using both said first and said second reputation information and including an age of said source and a recent activity level of said source.

2. The system as recited in claim 1, wherein said processor is further configured to request a third reputation information for a third type of communication format associated with said source.

3. The system as recited in claim 2, wherein said integrated reputation measure is further determined using said third reputation information.

4. The system as recited in claim 1, further comprising a first honeypot account associated with said first service provider, wherein said first honeypot account is configured to receive unsolicited communications associated with said first type of communication format, and wherein said second service provider is associated with a second honeypot account configured to receive other unsolicited communications associated with said second type of communication format.

5. The system as recited in claim 4, wherein said first reputation information is obtained from said first honeypot account, and wherein said second reputation information is received from said second honeypot account.

6. The system as recited in claim 1, wherein at least one of said first and second types of communication formats comprise Voice over Internet Protocol or instant message, and wherein at least one of said first and second types of communication formats comprise electronic mail.

7. The system as recited in claim 1, wherein said first type of communication format is associated with a Voice over Internet Protocol system, and wherein said second type of communication format is associated with an electronic mail system.

8. The system as recited in claim 5, wherein said second type of communication format is associated with an electronic mail system.

9. A method comprising:
receiving a request for connection from a source to an endpoint, wherein said connection is associated with a first type of communication format;
requesting a first reputation information associated with said first type of communication format and said source, wherein said first reputation information is maintained on a first database associated with a first service provider of said first type of communication format;
receiving said first reputation information;
accessing a second reputation information associated with a second type of communication format and said source, wherein said second reputation information is maintained on a second database associated with a second service provider of said second type of communication format, wherein said second reputation information is accessed in response to receiving said request for said connection associated with said first type of communication format, and wherein said source is associated with a plurality of different communication formats including said first and second communication formats;
indexing said first and second reputation information by one or more indices used to identify said source;
correlating said first reputation information for said source with said second reputation information that are indexed for said source;
determining an integrated reputation measure using both said first and said second reputation information together with an age and recent activity level of said source, wherein said integrated reputation measure is determined by a processor associated with said second service provider to provide a measure of said source's overall reputation for said plurality of different communication formats; and
refusing said request for connection with said endpoint when said integrated reputation measure indicates said source is associated with sending unsolicited communications associated with one or more of said plurality of different communication formats.

10. The method as recited in claim 9, wherein said first type of communication format is associated with Voice over Internet Protocol, and wherein said second type of communication format is associated with electronic mail.

11. The method as recited in claim 9, wherein said connection is associated with said first type of communication format.

12. The method as recited in claim 9, wherein said first type of communication format is associated with Voice over Internet Protocol, and wherein said second type of communication format is associated with instant messaging.

13. A system for providing integrated reputation service, said system comprising:
means for accessing reputation information associated with a source, wherein said source utilizes a plurality of different communication formats, and wherein said reputation information is obtained for each of said plurality of different communication formats in response to a request from said source for a connection using only one of said plurality of different communication formats;

means for indexing said reputation information for said plurality of different communication formats to identify said source upon receipt of a request from said source to connect with an endpoint;

means for correlating a first reputation information for said source for one of said plurality of different communication formats and a second reputation information for said source for another of said plurality of different communication formats;

means for determining an integrated reputation measure using said first and second reputation information, wherein said integrated reputation measure provides a measure of said source's reputation in determining whether or not to make said connection; and means for determining whether or not to connect said source with said endpoint based, at least in part, on said integrated reputation measure, an age of said source, and a recent activity level of said source.

14. The system as recited in claim 13, further comprising:

means for receiving a request for a communication session from said source, wherein said communication session is associated with said other communication format; and means for requesting said second reputation information from a remote reputation provider, wherein said first reputation information is stored in said system.

15. The system as recited in claim 13, wherein said one communication format is associated with Voice over Internet Protocol, and wherein said other communication format is associated with instant messaging.

16. The system as recited in claim 13, wherein said one communication format is associated with instant messaging, and wherein said other communication format is associated with electronic mail.

17. A tangible computer-usable medium having stored thereon computer-readable instructions that, in response to execution by a system, cause said system to perform operations comprising:

receiving a request for a communication session between an endpoint and a source, wherein said communication session is associated with a first type of communication format;

requesting a second reputation information associated with a second type of communication format and said source, wherein said source is associated with a plurality of different communication formats, and wherein said second reputation information is requested in response to receiving said request for said communication session comprising said first type of communication format;

receiving said second reputation information;

correlating a first reputation information associated with said first type of communication format for said source with said second reputation information for said source;

determining a reputation measure using said correlated first reputation information, wherein said reputation measure provides a measure of said source's reputation for transmitting unsolicited communications comprising said first type of communication format; and determining whether or not to connect said source with said endpoint based, at least in part, on said reputation measure, an age of said source, and a recent activity level of said source.

18. The tangible computer-usable medium as recited in claim 17, wherein said first type of communication format is associated with a Voice over Internet Protocol system, and wherein said second type of communication format is associated with an electronic mail system.

19. The tangible computer-usable medium as recited in claim 17, wherein said first type of communication format is associated with an instant messaging system, and wherein said second type of communication format is associated with an electronic mail system.

20. The tangible computer-usable medium as recited in claim 17, wherein said communication session is associated with said first type of communication format.

21. The method as recited in claim 17, wherein said second reputation information is requested by a processor associated with a first reputation service provider, and wherein said second reputation is provided by a second reputation service provider.

* * * * *